(No Model.)
J. W. BUCHANAN.
VEHICLE HUB.
No. 567,291. Patented Sept. 8, 1896.
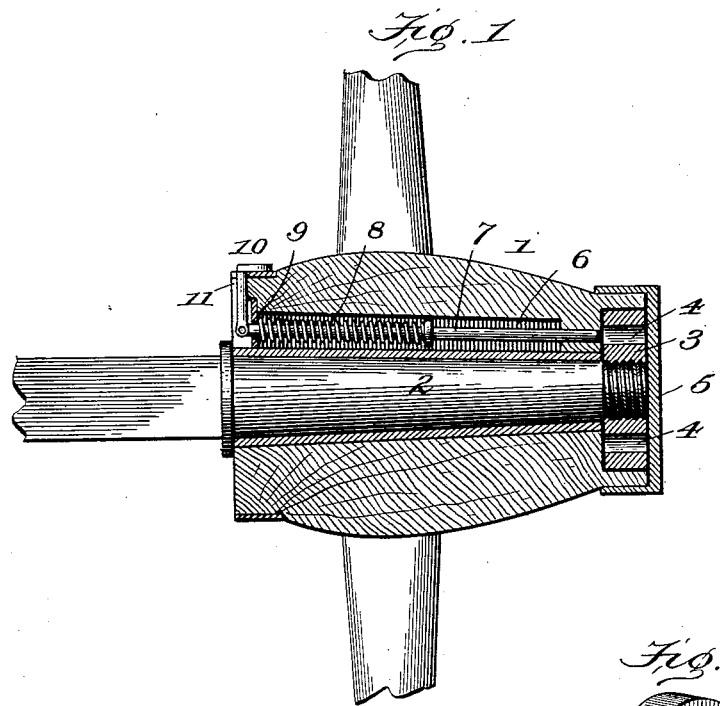
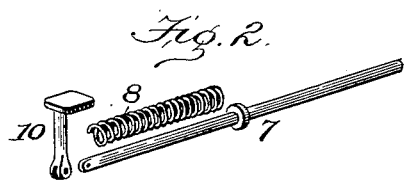
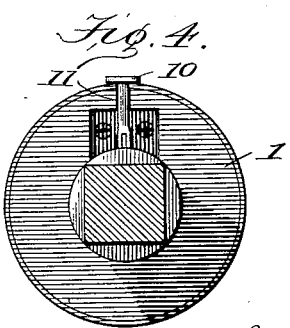
WITNESSES:
Edwin L. Bradford
K. A. Nau.
INVENTOR
James W. Buchanan
BY
John Wedderburn
his ATTORNEY.

UNITED STATES PATENT OFFICE.

JAMES W. BUCHANAN, OF ASHEVILLE, NORTH CAROLINA.

VEHICLE-HUB.

SPECIFICATION forming part of Letters Patent No. 567,291, dated September 8, 1896.

Application filed May 15, 1896. Serial No. 591,708. (No model.)

*To all whom it may concern:*

Be it known that I, JAMES W. BUCHANAN, a citizen of the United States, residing at Asheville, in the county of Buncombe and State of North Carolina, have invented certain new and useful Improvements in Hubs; and I do hereby declare the following to be a full, clear, and exact description of the invention, such as will enable others skilled in the art to which it appertains to make and use the same.

My invention relates to improvements in hubs of vehicles, the invention residing particularly in a wheel-detaching means connected with said hub whereby the wheel may be readily removed without the use of a wrench.

The invention consists of a hub having a lateral recess extending therethrough, a pin fitting in said recess, a spring for normally urging said pin outward, a T-arm on the upper end of said pin, and a nut for the shaft-spindle, the said nut having slots or perforations therein, which are adapted to be engaged by said pin when the latter is in its outer position.

It also consists in other details of construction and combinations of parts, which will be hereinafter more fully described.

In the drawings, Figure 1 represents a sectional view of a hub with my improvements applied thereto. Fig. 2 is a detail view of the pin and the spring for actuating the same. Fig. 3 is a similar view of the securing-nut fitting upon the outer end of the spindle. Fig. 4 is an end view of the hub.

Like reference-numerals indicate like parts in the different views.

1 represents the hub of a vehicle, through which the spindle 2 projects, upon the outer end of which fits the nut 3, provided with slots or perforations 4 therein. Fitting over the end of the hub 1 and covering the end of the spindle 2 and the nut 3 is a cap or cover 5, which is permanently secured in place. Fitting the recess 6 in the hub 1 and extending longitudinally therethrough is a pin 7, which is normally urged outward by a coil-spring 8, surrounding said pin and abutting against a shoulder 9 in said recess. The inner end of said pin has pivotally secured to it a T head or handle 10. The pin 7 is adapted to fit within one of the slots or perforations 4 in the nut 3 when the said pin is in its outer position. The normal position of said pin, however, is in its upper or raised position with the head 10 turned over and fitting a notch 11 in the inner surface of the hub.

When it is desired to attach the hub 1 to the spindle 2, the pin 7 is released and brought into engagement with the nut 3, preventing the latter from turning. The hub is then placed over the spindle and rotated in a forward direction, screwing the nut up upon the threads on the spindle and tightening it in the usual way. The pin is now withdrawn by pulling back upon the handle 10 and turning the latter over. If at any time it is desired to remove the wheel, it can be readily done by releasing the pin 7 and permitting it to be thrown outward by the spring 8 into engagement with one of the perforations 4 in the nut 3. The nut is now held rigid, and by turning back the hub 1 it will be unscrewed from the spindle 2, and the said hub and wheel can be removed.

It will be seen that my device as described is extremely simple in construction, and by means of it a wheel can be removed without the use of a wrench.

Having now described my invention, what I claim as new, and desire to secure by Letters Patent, is—

The combination with the hub of a wheel, a spindle extending therethrough, a nut fitting the end of said spindle having slots or perforations therein, and a cap or cover for inclosing said nut, of a pin extending longitudinally through said hub and adapted to fit the perforations in said nut, a spring for normally urging said pin outwardly and a handle upon the inner end of said pin which is pivoted thereto and adapted to be turned over, for the purpose of holding said pin in its inner position, substantially as and for the purpose described.

In testimony whereof I have signed this specification in the presence of two subscribing witnesses.

JAMES W. BUCHANAN.

Witnesses:
GEO. H. VALENTINE,
WALTER S. CUSHMAN.